United States Patent [19]

Eash

[11] Patent Number: 4,714,290
[45] Date of Patent: Dec. 22, 1987

[54] SIMULATED PADDED CAR ROOF COVER

[75] Inventor: David D. Eash, Woodbine, Md.

[73] Assignee: E&G Classics, Inc., Columbia, Md.

[21] Appl. No.: 837,687

[22] Filed: Mar. 10, 1986

[51] Int. Cl.⁴ .............................................. B62D 25/06
[52] U.S. Cl. ....................................... 296/210; 428/31
[58] Field of Search ......................... 428/31, 34, 542.8;
150/52 K; 296/210

[56] References Cited

U.S. PATENT DOCUMENTS

| | | | |
|---|---|---|---|
| 3,265,530 | 8/1966 | Marzocchi et al. | 428/251 |
| 3,709,770 | 1/1973 | Hale | 428/31 X |
| 3,846,200 | 11/1974 | Doerfling et al. | 156/212 X |
| 3,910,330 | 10/1975 | Johnson et al. | 428/900 X |
| 3,926,471 | 12/1975 | Nadasi et al. | 428/31 X |
| 3,935,353 | 1/1976 | Doerfling et al. | 428/31 X |
| 4,029,532 | 6/1977 | Warhol et al. | 156/71 |
| 4,154,473 | 5/1979 | Alexander et al. | 296/210 |
| 4,184,713 | 1/1980 | Matsui et al. | 296/210 |
| 4,218,088 | 8/1980 | Swindlehurst et al. | 296/210 |
| 4,268,552 | 5/1981 | Duvdevani et al. | 428/31 |
| 4,514,449 | 4/1985 | Budich et al. | 428/212 X |
| 4,606,573 | 8/1986 | Schneider | 296/210 |

OTHER PUBLICATIONS 1985-86 Cadillac Coupe de Ville Half Top Package Installation Instructions and Parts List, copyright 1985 by E & G Classics, Inc.
1985 Cadillac Sedan de Ville and Fleetwood ¼ Top Package Installation Instructions, Illustration No. 6, p. 7 and illustration No. 7, p. 8.
1985 Buick Electra & Park Avenue Half Top Package, E & G Classics, Inc.

Primary Examiner—Henry F. Epstein
Attorney, Agent, or Firm—Saidman, Sterne, Kessler & Goldstein

[57] ABSTRACT

A vinyl covered fiberglass shell preformed to fit the roof of an automobile. The vinyl covered fiberglass shell simulates the appearance of a padded vinyl fiberglass roof cover without the use of padding. The fiberglass shell includes a series of recesses which are molded into the outer surface of the shell when the shell is first formed. The vinyl covering is then placed over the entire outer surface of the fiberglass shell including the recessed portions. Decorative pieces such as molding strips, decorative letters, and an emblem are placed over the vinyl covering in the location of the recesses.

12 Claims, 6 Drawing Figures

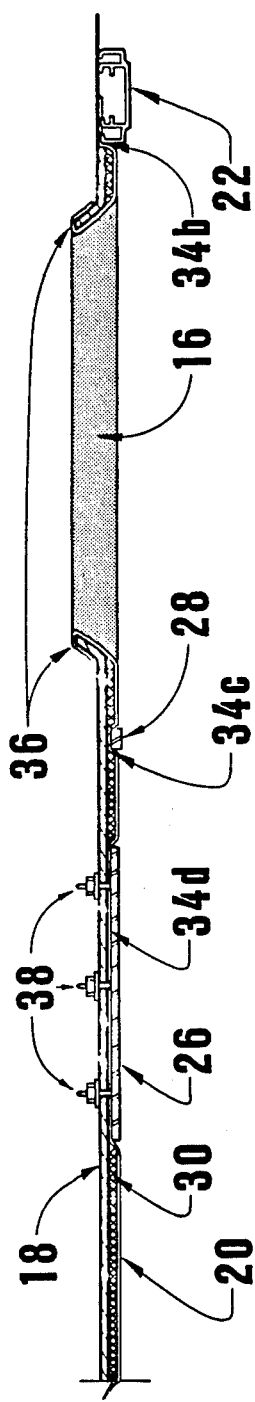
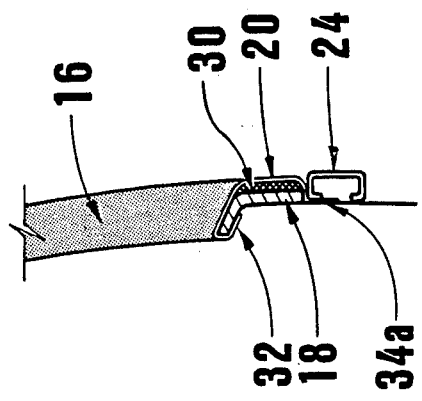
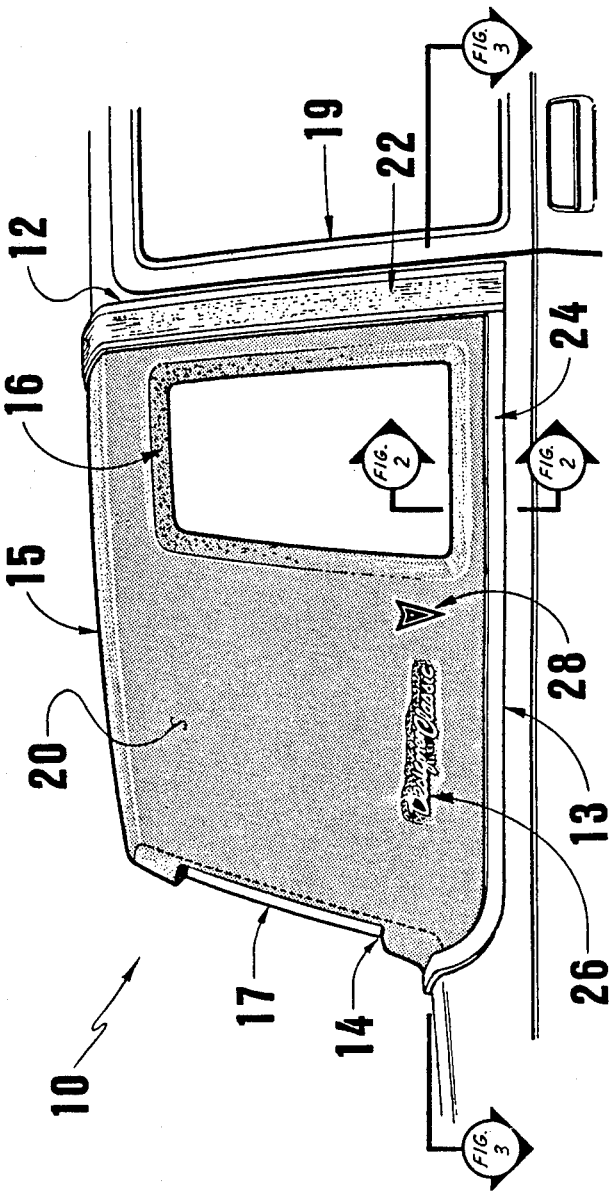

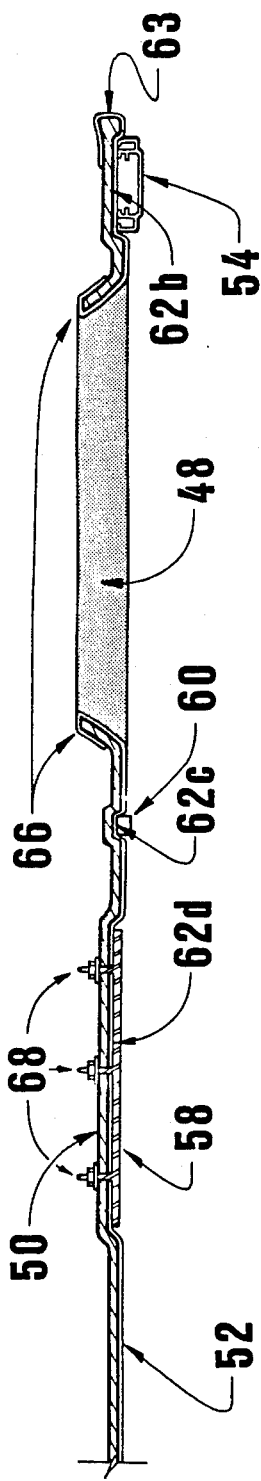
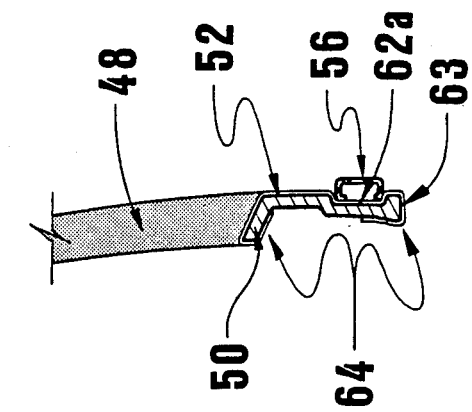
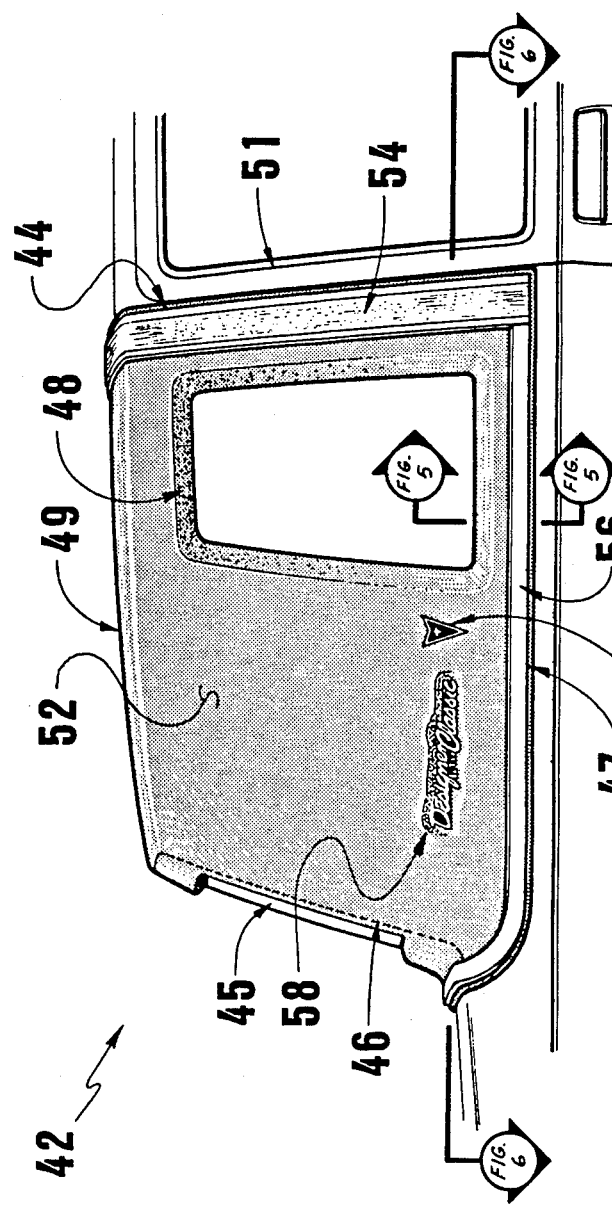

(1)

SIMULATED PADDED CAR ROOF COVER

BACKGROUND OF THE INVENTION

1. Field of the Invention

The present invention relates to an apparatus for covering the roof of an automobile and more particularly, is directed towards an unpadded roof cover which provides the same appearance as a padded roof cover. 2. Description of the Related Art Vinyl covered automobile roofs are known. As an alternative to affixing a vinyl cover directly to the regular roof of the automobile, it is also known to secure a vinyl cover to a fiberglass shell which is preformed to fit over the roof of the automobile.

In applying such a vinyl cover to the fiberglass shell, it is customary to interpose a layer of foam padding or the like between the fiberglass shell and the vinyl cover. This padding is used to enhance the appearance of the automobile by providing an automobile top with a luxurious, cushioned, padded appearance. To further improve the appearance of the automobile, decorative pieces such as molding strips, emblems and decorative letters can be placed on the vinyl cover. The emblems and decorative letters not only add to the appearance of the car, but function to identify the type of car.

However, this method of covering an automobile roof with a vinyl covered fiberglass shell that has a layer of padding under the vinyl, suffers from several drawbacks and deficiencies. First of all, the necessity for interposing padding is expensive and time consuming. The expense is a result not only of the cost of the foam material itself but of the additional labor costs in first having to affix the padding to the fiberglass shell before being able to attach the vinyl and decorative pieces.

Moreover, in order to attach the decorative pieces, portions of the padding must be cut or carved out before the vinyl is attached. That is, a space corresponding to the particular decorative piece it is designed to accommodate must be created in the padding. This "carving out" of the padding is time-consuming, expensive (labor costs) and is not a simple task. Portions must be carved out, for example, along peripheral portions to accommodate molding strips as well as in center portions to accommodate emblems and decorative letters. If these portions are not cut with precision, the decorative pieces will not fit properly and therefore the objective of enhancing the appearance of the automobile roof will be defeated.

The complications involved in carving out portions of the padding are further highlighted by the fact that the carving out of the padding is done at the post-manufacturing stage. Therefore, the installer of the vinyl cover, rather than the manufacturer of the fiberglass shell, must create the spaces in the padding for accommodating the decorative pieces.

Therefore, a need exists for a simpler method of making a vinyl covered fiberglass shell with a padded appearance that can accommodate decorative pieces. That is, there exists a need for a vinyl covered fiberglass shell which provides the same appearance as a padded vinyl car roof but which does not require a padding layer and therefore overcomes the aforementioned drawbacks associated with the use of padding.

SUMMARY OF THE INVENTION

The present invention overcomes the aforementioned problems and deficiencies in the art. The present invention provides an apparatus for covering an exterior portion of an automobile roof which comprises means for simulating a padded vinyl automobile roof without the use of padding. The means includes a shell having an outer surface and an inner surface adapted to be secured to the exterior portion of the automobile roof, the outer surface having recess means formed therein, and a vinyl covering secured directly to the outer surface of the shell.

The recess means preferably comprises first and second recesses wherein the first recess extends along a bottom peripheral portion of the outer surface of the shell and is adapted to receive a bottom decorative molding. The second recess extends along a front side peripheral portion of the outer surface of the shell and is adapted to receive a side decorative molding. The apparatus may further comprise a third recess disposed in the outer surface of the shell adapted to receive an emblem and a fourth recess disposed in the outer surface of the shell and adapted to receive decorative letters.

A decorative molding may be secured to the shell over the vinyl cover at the location of the second recess and an emblem may be secured to the shell over the vinyl cover at the location of the third recess.

The shell, which may also include a side window opening and a rear window opening, is preferably made of a substantially rigid fiberglass material preformed to fit the exterior portion of the automobile roof. The vinyl covering is preferably adhesively secured to the outer surface of the shell and preferably covers the entire outer surface including the recess means.

The present invention further provides a method of making a simulated padded top for an automobile roof. The method comprises the steps of providing a relatively rigid shell shaped to fit over the automobile roof, preforming in the shell at least one recess for receiving a decorative piece, and securing a vinyl cover directly over the rigid shell and the recess to thereby simulate a padded vinyl automobile roof. Preferably a first recess is formed in the outer surface of the shell for receiving a decorative emblem and a second recess is formed in the outer surface of the shell for receiving a decorative molding strip. The recesses are preferably molded into the shell when the shell is first formed. An emblem may be secured to the shell over the vinyl cover at the location of the first recess and a decorative molding may be secured to the shell over the vinyl cover at the location of the second recess.

The method may further include the steps of forming a side window opening and a rear window opening in the shell when the shell is first formed, and securing the shell to the automobile roof.

BRIEF DESCIRPTION OF THE DRAWINGS

Various objects, features and attendant advantages of the present invention would be more fully appreciated as the same becomes better understood from the following detailed description of the present invention when considered in connection with the accompanying drawings, in which:

FIG. 1 is a perspective view showing a a padded car roof of the prior art;

FIG. 2 is a cross-sectional view of the padded car roof of the prior art taken along line 2—2 of FIG. 1;

FIG. 3 is a cross-sectional view of the padded car roof of the prior art taken along line 3—3 of FIG. 1;

FIG. 4 is a perspective view showing a preferred embodiment of a the simulated padded car roof of the present invention;

FIG. 5 is a cross-sectional view of the simulated padded car roof of the present invention taken along line 5—5 of FIG. 4; and FIG. 6 is a cross-sectional view of the simulated padded car roof of the present invention taken along the line 6—6 of FIG. 4.

DETAILED DESCRIPTION OF THE PREFERRED EMBODIMENT

Referring now to the drawings, wherein like reference numerals represent identical or corresponding parts throughout the several views, FIGS. 1–3 illustrate a padded vinyl car roof of the prior art, and FIGS. 4–6 illustrate a preferred embodiment of the simulated padded vinyl car roof of the present invention. The simulated padded vinyl car roof of the present invention obviates the need for placing a padding layer between the vinyl cover and the fiberglass shell.

The Prior Art (FIGS. 1-3)

Referring more particularly to FIG. 1, the padded car roof of the prior art is indicated generally by reference numeral 10, and is shown mounted to the roof portion of an automobile rearwardly of the car door 19. The padded car roof 10 has a front edge 12, a bottom edge 13, a top 15, a rear portion 14, a side window opening 16 and a rear window opening 17.

Normally secured to the exterior surface of the padded car roof 10 are four decorative pieces 22, 24, 26 and 28. These decorative pieces include a side molding strip or top band 22, a bottom molding strip or belt molding 24, decorative letters 26, and an emblem 28.

As seen in FIGS. 2 and 3, the padded car roof 10 of the prior art is comprised of three layers: an inner fiberglass shell 18, a foam padding 30, and an outer vinyl cover 20. The foam padding 30 is interposed between the vinyl cover 20 and the fiberglass shell 18 to provide the automobile roof with a cushioned, padded appearance.

The foam padding 30 is secured to the entire outer surface of the fiberglass shell 18 and has, in the illustrated embodiment, four carved out portions 34a, 34b, 34c and 34d to accommodate the decorative pieces 22, 24, 26 and 28. Portion 34a, which is located along a region corresponding to the bottom peripheral portion of the fiberglass shell 18, extends from the front edge 12 around the rear portion 14, and is carved out of the foam padding 30 to accommodate bottom molding strip 24. Portion 34b, carved out along the region corresponding to the front side peripheral portion of the fiberglass shell 18, extends from the bottom edge 13 over the top 15 in order to receive the side molding strip 22. Portion 34c is carved out of the foam padding 30 in a region adjacent the window opening 16 to receive the emblem 28, and longitudinal portion 34d is carved out adjacent portion 34c to accommodate the decorative letters 26.

Once the portions 34a, 34b, 34c and 34d are carved out of the foam padding 30, the vinyl cover 20 is secured, by adhesive, to the foam padding 30 except in the carved out portions 34a, 34b, 34c and 34d where vinyl cover 20 is adhesively affixed directly to the fiberglass shell 18. Overhanging portions of vinyl cover 20, represented by numerals 32 and 36, are wrapped around the side window opening 16.

After attachment of the vinyl cover 20, the decorative pieces 22-28 are secured to the vinyl cover 20 in the respective regions overlying the carved out portions 34a, 34b, 34c and 34d of the foam padding 30. The decorative letters 26 may be secured to the fiberglass shell 18 by a set of three screws 38, and the emblem 28 is typically secured by adhesive to the vinyl cover 20. Although FIG. 1 shows the "Designer Classic" decorative letters 26 and a "Pontiac" emblem 28, other decorative letters and emblems may obviously be used to identify the automobile.

The decorative molding strips 22 and 24, made preferably of aluminum, are secured in a similar fashion to the vinyl cover 20 in the regions overlying the respective carved out portions 34b and 34a, typically by a series of molding clips screwed into the fiberglass shell 18. As illustrated in FIG. 1, side molding strip 22 extends from the bottom edge 13 over top 15. Bottom molding strip 24 is also curved as it extends from front edge 12 to rear portion 14. The side and bottom molding strips 22 and 24 are each preferably disposed a sligt distance from the front and bottom edge 12 and 13, respectively, so that a portion of the vinyl cover 20 adjacent these edges may be visible. The method of attaching the molding strips is set forth in further detail, for example, in E & G Classics, Inc. literature entitled "1985-86 Cadillac Coupe DeVille Half Top Package—Installation Instructions and Parts List" and in "1985 Buick Electra and Park Avenue Half Top Package Installation Instructions."

The padded car roof 10 is then secured to an exterior portion of an automobile roof so that the front edge 12 is adjacent the door 19 of the automobile, the rear edge 14 is adjacent the rear window of the automobile, and the side window and rear window openings 16 and 17 are in overlying alignment with the rear side window and the rear window of the automobile, respectively. One method of securing the padded car roof to the roof of an automobile is also set forth in the E&G Classics Inc. literature mentioned above.

It should also be noted that the vinyl cover 20 and any or all of the decorative pieces 22-28 can be affixed after, rather than before, the padded car roof 10 is secured to the automobile roof.

The Present Invention (FIGS. 4-6)

Referring now to the present invention, illustrated in FIGS. 4–6, a simulated padded car roof 42 is shown which eliminates the need for a padding layer between the vinyl and the shell, while still providing a cushioned, padded appearance similar to that of the prior art.

As illustrated in FIG. 4, the simulated padded car roof 42 is secured to the roof of the car to the rear of car door 51, and includes a front edge 44, a rear edge 46, a bottom edge 47, a top 49, a side window opening 48 and a rear window opening 45.

As seen from FIGS. 5 and 6, the two-layered car roof 42 of the present invention comprises an inner fiberglass shell 5 and an outer vinyl covering 52. There is no need for a padding layer and therefore no need to undergo the expensive, complicated and time consuming task of carving out specific portions of padding to accommodate the decorative pieces. Instead, in accordance with the present invention, the fiberglass shell 5 is preformed with a set of recesses 62a, 62b, 62c and 62d shaped to receive four decorative pieces: a side molding strip 54, a bottom molding strip 56, decorative letters 58, and an emblem 60. The visual effect of the recesses is to simulate the carved out portions of the prior art padding, thereby obviating the need for the padding altogether.

The four preformed recesses 62a, 62b, 62c and 62d are molded into the exterior surface of shell 50. The lower recess 62a preferably extends adjacent the bottom peripheral portion of shell 50 from the front edge 44 around the rear edge 46 to a rear portion of the shell and is shaped to receive the bottom molding strip 56. The side recess 62b, shown wider than the lower recess 62a, preferably extends adjacent the front peripheral portion of shell 50 from the bottom edge 47 over the top 49. The side recess 62b is shaped to receive the side molding strip 54. Both lower recess 62a and side recess 62b are preferably formed a slight distance inwardly from the bottom edge 47 and the front edge 44, respectively, so that the decorative molding strips, when attached, are not touching these edges.

Small recess 62c is formed adjacent window opening 48 to receive emblem 60, and longitudinal recess 62d is formed adjacent recess 62c to receive decorative letters 58. As noted above, the illustrated letters 58 and emblem 60 are provided only as examples of decorative pieces since other decorative letters and emblems can be used. Obviously, recesses of different sizes or shapes as well as in different locations can be preformed in the fiberglass shell 50 in order to accommodate varying shapes and sizes of decorative pieces.

The vinyl covering 52 is secured, preferably by adhesive, to the entire exterior surface of the fiberglass shell 50, including the recesses 62a-62d. Reference numeral 64 in FIG. 5 illustrates the overhang portion of vinyl covering 52 that extends over a fiberglass return 63 and is wrapped around bottom edge 47, and the overhang portion of vinyl covering 52 which is wrapped around a bottom portion of side window opening 48. Reference numeral 66 of FIG. 6 illustrates the overhang portions of the viny covering 52 which are wrapped around opposing ends of side window opening 48. An overhand portion (not shown) of vinyl covering 52 is also preferably wrapped around front edge 44.

The decorative pieces 54-60 are secured over the vinyl covering 52 in the location of the respective recesses 62a-62d. Preferably, bottom molding strip 56 is secured in the location of the lower recess 62a by molding clips (not shown), side molding strip 54 is secured in the location of the side recess 62b also by molding clips (not shown), decorative letters 58 are secured in the location of the longitudinal recess 62d by screws 68, and emblem 60 is secured in the location of small recess 62c by adhesive. A more detailed discussion of the preferred method of attaching the molding strips 54 and 56 and the emblem 60 can be found for example in E&G Classics Inc. literature entitled "1985-86 Cadillac Coupe DeVille Half-top Package—Installation Instructions and Parts List." The method of attaching decorative letters 58 is described in E & G Classics, Inc. pamphlet entitled, "1985 Buick Somerset Regal, Oldsmobile Calais And Pontiac Grand Am [N-Body] Half Top Installation Instructions and Parts List."

As illustrated in FIG. 4, side molding 54 is preferably L-shaped so that it can extend over top 49 of simulated padded car roof 42. Bottom molding 56 is preferably curved so that it can extend around rear edge 46 to the rear porion of the car roof 42.

The simulated padded car roof 42 is secured to the exterior portion of the automobile roof preferably in a manner set forth in the aforementioned E&G Classics, Inc. literature. Once secured, the front edge 44 is disposed adjacent the door 51 of the automobile, the side window opening 48 is disposed in overlying alignment with a side rear window of the automobile, and the rear window opening 45 is disposed in overlying alignment with a rear window of the automobile.

The emblem 60 and molding strips 54 and 56 preferably are attached after the simulated padded car roof 42 is secured to the automobile roof, while the decorative letters 58 are preferably secured to the shell before it is attached to the car. However, any or all of these decorative pieces 54-60 may be attached to the shell either before or after the shell is attached to the car. The vinyl covering 52 can also be secured either before or after the fiberglass shell 50 is attached to the automobile roof.

The simulated padded car roof 42 of the present invention, when secured to the automobile roof, provides a similar cushioned, padded appearance as the padded car roof of the prior art. However, it advantageously obviates the need for padding and therefore avoids all the problems and disadvantages associated with the use of a padding layer.

It is understood that the foregoing is considered as illustrative only of the principles of the invention. Therefore, within the scope of the appended claims, the invention may be practiced otherwise than as specifically described herein.

I claim as may invention:

1. A cover for covering an exterior portion of an automobile roof, comprising:
   means for simulating a padded vinyl automobile roof without the use of padding, said means including:
   (a) a shell having an outer surface and an inner surface, said inner surface of said shell adapted to be secured to the exterior portion of the automobile roof;
   (b) recess means formed in said outer surface of said shell; and
   (c) a vinyl covering secured directly to said outer surface of said shell.

2. A cover as recited in claim 1, wherein said recess means comprises first and second recesses.

3. A cover as recited in claim 2, wherein said first recess extends along a bottom peripheral portion of said outer surface of said shell and is adapted to receive a bottom decorative molding.

4. A cover as recited in claim 3, wherein said second recess extends along a front side peripheral portion of said outer surface of said shell and is adapted to receive a side decorative molding.

5. A cover as recited in claim 4, further comprising a third recess disposed in said outer surface of said shell, said third recess adapted to receive an emblem.

6. A cover as recited in claim 5, further comprising a fourth recess disposed in said outer surface of said shell, said fourth recess adapted to receive decorative letters.

7. A cover as recited in claim 1, wherein said shell comprises a substantially rigid fiberglass material preformed to fit the exterior portion of the automobile roof.

8. A cover as recited in claim 7, wherein said vinyl covering is adhesively secured to said outer surface of said shell.

9. A cover as recited in claim 8, wherein said vinyl covering covers the entire outer surface of said shell including said recess means.

10. A cover for covering an exterior portion of an automobile roof, comprising:
   means for simulating a padded vinyl automobile roof without the use of padding, said means including:
   (a) a relatively rigid fiberglass shell preformed to fit the roof of the automobile, said shell having an inner surface, an outer surface, and first and second recesses;
   (b) said first recess formed in said outer surface of said shell and adapted to receive a decorative emblem;
   (c) said second recess formed in said outer surface of said shell and adapted to receive a decorative molding strip;
   (d) a vinyl cover secured directly to said outer surface of said shell and covering said first and said second recesses;
   (e) an emblem secured to said shell over said vinyl cover at the location of said first recess; and
   (f) a decorative molding secured to said shell over said vinyl cover at the location of said second recess.

11. A cover as recited in claim 10, wherein said shell further comprises a side window opening.

12. A cover as recited in claim 10, wherein said shell further comprises a rear window opening.

* * * * *

UNITED STATES PATENT AND TRADEMARK OFFICE
CERTIFICATE OF CORRECTION

PATENT NO. : 4,714,290
DATED : December 22, 1987
INVENTOR(S) : DAVID D. EASH

It is certified that error appears in the above—identified patent and that said Letters Patent is hereby corrected as shown below:

Column 4, line 62, change "5" to --50--.

Column 4, line 67, change "5" to --50--.

Column 6, line 32, change "may" to --my--.

Signed and Sealed this

Thirtieth Day of August, 1988

Attest:

DONALD J. QUIGG

*Attesting Officer*

*Commissioner of Patents and Trademarks*